(12) United States Patent  (10) Patent No.: US 8,251,265 B2
Grudek                     (45) Date of Patent:     Aug. 28, 2012

(54) SPARE TIRE CARRIER FOR ALL-TERRAIN VEHICLES

(76) Inventor: Michael A. Grudek, Encinitas, CA (US)

( * ) Notice: Subject to any disclaimer, the term of this patent is extended or adjusted under 35 U.S.C. 154(b) by 115 days.

(21) Appl. No.: 13/005,345

(22) Filed: Jan. 12, 2011

(65) Prior Publication Data
US 2012/0175388 A1    Jul. 12, 2012

(51) Int. Cl.
  *B60R 9/00* (2006.01)
  *B62D 43/00* (2006.01)
(52) U.S. Cl. ............. 224/42.12; 224/519; 224/521; 224/42.24
(58) Field of Classification Search ............ 224/42.12, 224/519, 530, 521, 42.24, 42.26; 414/462; 296/37.2
See application file for complete search history.

(56) References Cited

U.S. PATENT DOCUMENTS

| | | | |
|---|---|---|---|
| 3,343,736 A | 9/1967 | Sellers | |
| 3,387,754 A | 6/1968 | Sinky et al. | |
| 4,410,117 A | 10/1983 | Crawford et al. | |
| 4,416,402 A | 11/1983 | Matthew | |
| 4,418,851 A | 12/1983 | Ankeny | |
| 4,484,699 A | 11/1984 | Heck | |
| 4,561,575 A | 12/1985 | Jones | |
| 4,811,874 A | 3/1989 | Robison | |
| 4,915,274 A | 4/1990 | Oliver | |
| 4,964,552 A | 10/1990 | Terwilliger | |
| 4,971,237 A * | 11/1990 | Davis | 224/506 |
| 5,022,573 A | 6/1991 | Barkouskie | |
| 5,027,991 A | 7/1991 | Braddock | |
| 5,076,629 A | 12/1991 | Peters et al. | |
| 5,183,192 A | 2/1993 | Mrozowski et al. | |
| 5,186,371 A | 2/1993 | Jozefczak et al. | |
| 5,197,641 A | 3/1993 | Montgomery, Jr. | |
| 5,215,232 A | 6/1993 | Wyers | |
| 5,222,640 A | 6/1993 | Teson | |
| 5,333,766 A | 8/1994 | Fisher | |
| 5,370,285 A | 12/1994 | Steelman | |
| 5,388,737 A | 2/1995 | Myers et al. | |
| 5,427,287 A | 6/1995 | Harrison | |
| 5,451,088 A * | 9/1995 | Broad | 296/26.08 |
| 5,458,389 A * | 10/1995 | Young | 296/26.08 |
| 5,487,288 A | 1/1996 | Frantz | |
| 5,775,560 A | 7/1998 | Zahn et al. | |
| 7,597,222 B2 | 10/2009 | Bishop et al. | |
| 2005/0023315 A1* | 2/2005 | Skinner | 224/506 |
| 2006/0053667 A1* | 3/2006 | Andersen | 40/591 |
| 2006/0091167 A1 | 5/2006 | Bishop et al. | |

* cited by examiner

*Primary Examiner* — Justin Larson
*Assistant Examiner* — Lester L Vanterpool
(74) *Attorney, Agent, or Firm* — George S. Levy

(57) ABSTRACT

A spare tire carrier that preserves the vehicle approach angle. The carrier comprises a hitch anchor configured to be mounted on a vehicle towing hitch; a fork having tines affixed to the back end of the hitch anchor by means of a hinge; a sleeve slidingly mounted on the fork's handle; a lower shoulder bar essentially perpendicularly mounted onto the sleeve; an upper shoulder bar slidingly mounted on the lower shoulder bar and a rim holder affixed to the upper shoulder bar. The device is constructed of telescoping bars that can be slidingly adjusted and kept in place by pins. This design allows the shape of the device to be modified and to accommodate a diversity of tire sizes. This invention can also be used as a jack by positioning the rim holder on the ground as a fulcrum and using the device as a lever to lift a car.

11 Claims, 9 Drawing Sheets

SPARE TIRE CARRIER FOR ALL-TERRAIN VEHICLES

FIELD OF THE INVENTION

This invention relates to racks used to carry spare tires in cars. More specifically, it relates to spare tire racks of use in all terrain vehicles (ATVs), such vehicles also known as quads, quad bikes and four wheelers.

BACKGROUND

The chassis of ordinary cars extends horizontally in front of the wheels and supports a bumper situated approximately at the same level as the axle of the vehicle. This configuration however is not adequate when tall obstacles need to be surmounted. In all terrain vehicles (ATV's) this problem is resolved by shaping the chassis with an upward angle as it extends toward the front. This allows the vehicle to roll over these obstacles without having the chassis or chassis bump into them. The shape of the chassis in the rear of ATV's is configured in the same manner to prevent damage as the vehicle rolls down an obstacle. This geometry is called the approach angle. It is defined as the steepest incline angle that a vehicle can approach and drive up without encountering front bumper or undercarriage damage.

The mounting of a spare tire at the rear of an ATV must preserve this approach angle if possible. The prior art abounds with automotive spare tire carriers, but these are designed for ordinary cars and trucks that operate on roads; they are not designed specifically for ATV's and pay no consideration to preserving the approach angle.

Further features, aspects, and advantages of the present invention over the prior art will be more fully understood when considered with respect to the following detailed description and claims.

SUMMARY OF THE INVENTION

This invention is a spare tire carrier adapted to preserve the approach angle of All Terrain Vehicles (ATV). It is constructed of telescoping bars that allow its dimensions to be altered to accommodate a wide diversity of wheel sizes. It allows the spare tire to be held under the ATV at an angle thus essentially preserving the approach angle of the vehicle. The invention comprises the following components:

a) A hitch anchor that can be inserted into the hitch of a car.
b) A fork which is attached by its tines to the hitch anchor. The attachment means is a hinge that allows the angle between the fork and the hitch anchor to be adjusted. The hinge can be held in a fixed position by means of holding pins. The adjustment of this angle allows the approach angle of the vehicle to be essentially preserved.
c) A sleeve that slides over the fork's handle and that can be secured in place by means of holding pins.
d) A lower shoulder bar perpendicularly affixed to the sleeve.
e) An upper shoulder bar that can slide in and out of the lower shoulder bar to accommodate a diversity of rim sizes and thicknesses.
f) A rim holder configured with a set of holes to match a specific lug pattern, or with an array of holes to match a diversity of lug patterns.

This invention also allows the spare tire to be partially supported by the hitch anchor thereby reducing the amount of force required to support it, minimizing the flexibility of the support mechanism and lessening the amount of vibration.

The invention furthermore allows the tire to be mounted between the supporting mechanism and the body of the car thereby protecting the tire and allowing the tire to be supported by the hitch anchor.

By rotating the sleeve 180 degrees around its axis, it may be possible to carry the tire facing up or facing down depending on the space available on board the vehicle.

When the hitch is too large for the hitch anchor, it is possible to insert a sheath over the hitch anchor to make it fit properly inside the hitch.

It is also possible to configure this invention as a lever to be used as a lifting jack. The device must be rotated such that the rim holder faces the ground, thus providing a fulcrum. The sleeve should be slid over the fork handle such that one side of the lever is longer than the other. Optionally, a jack platform can be mounted on the shorter arm of the lever. The shorter arm of the lever (optionally with the jack platform) is then placed under an ATV and a downward force is applied on the longer arm to lift the ATV.

DETAILED DESCRIPTION

Figure 1:
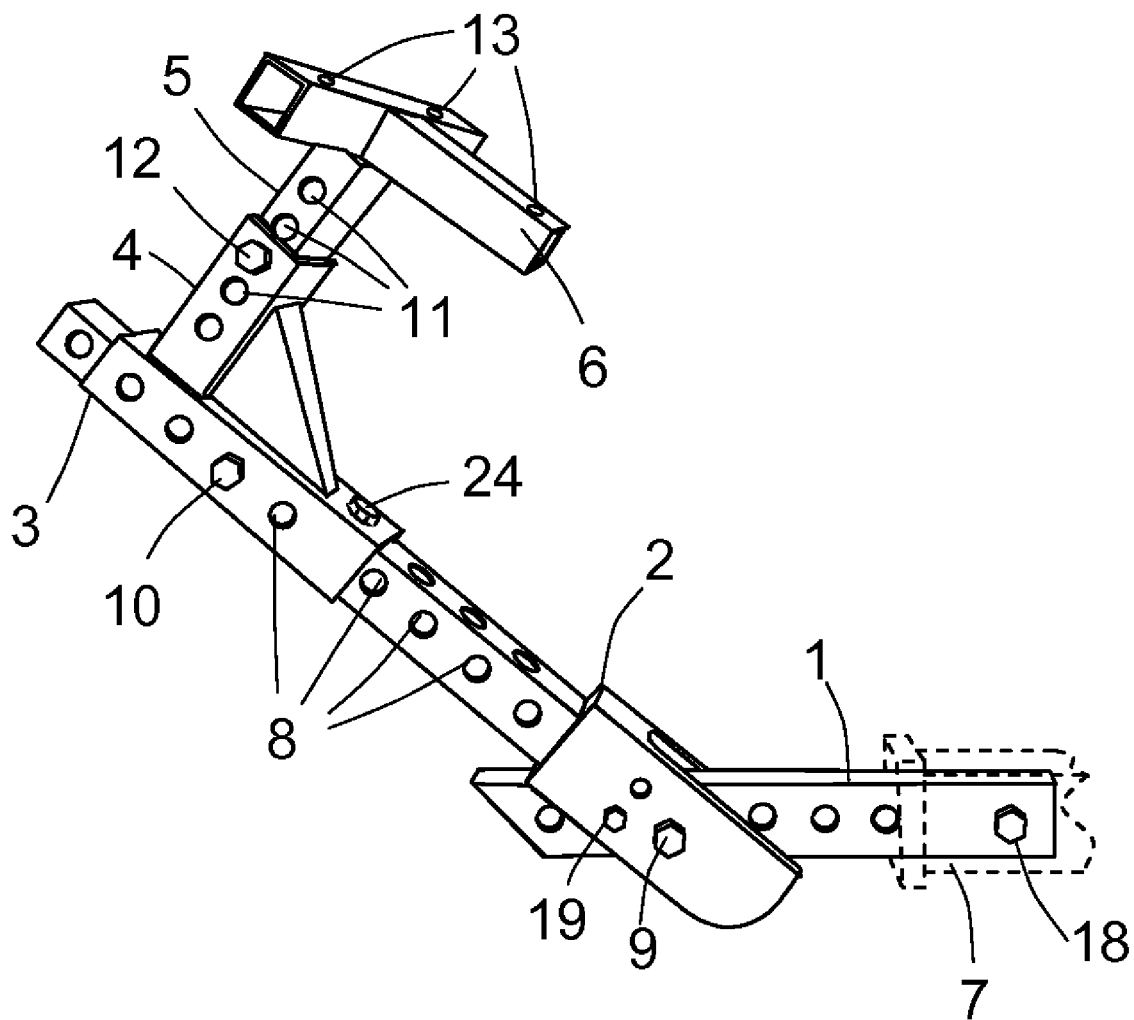
FIG. 1 illustrates the fully assembled invention comprising a hitch anchor, a fork, a sleeve, a lower shoulder bar, an upper shoulder bar, and a rim holder.
Figure 2:
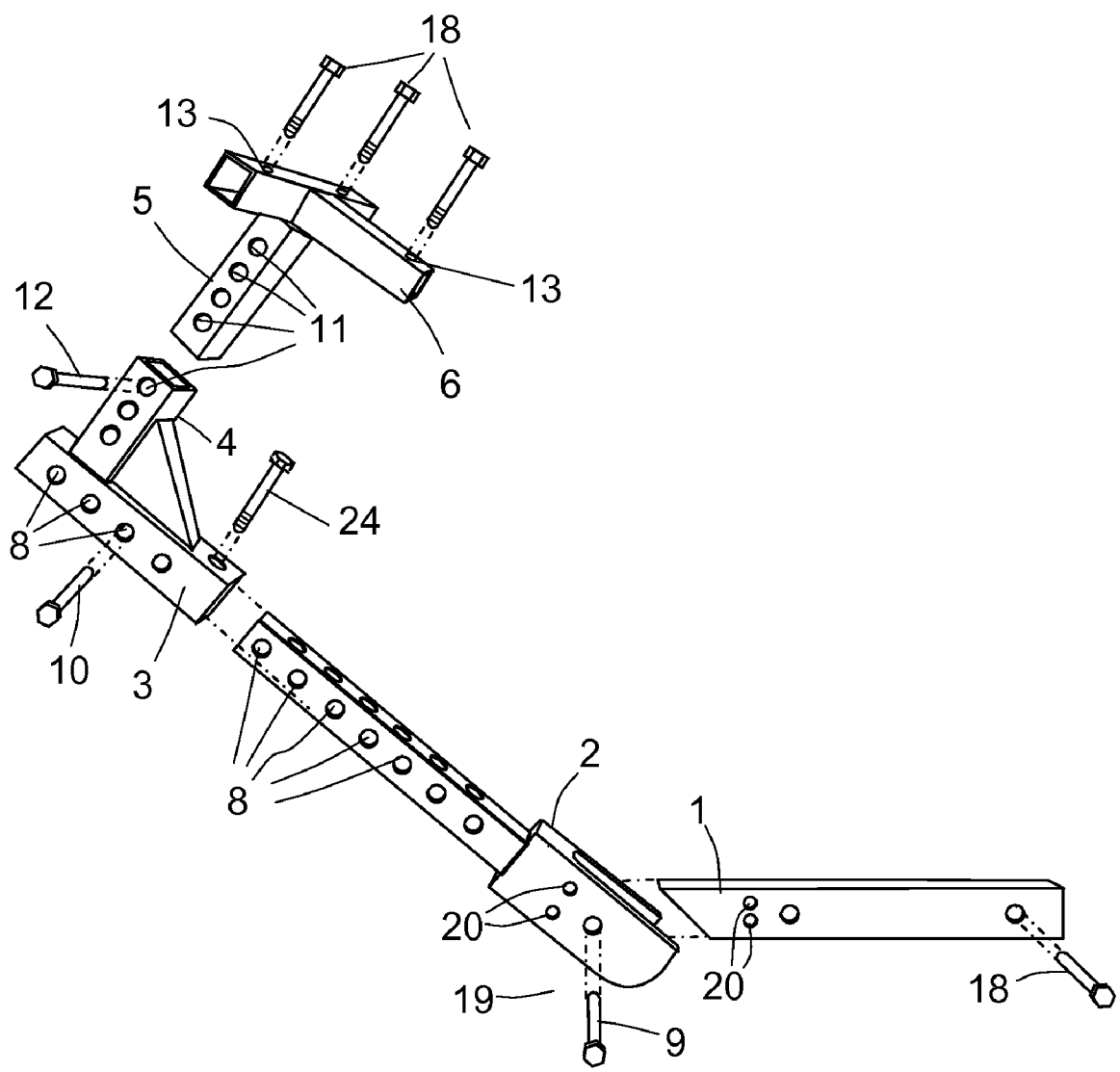
FIG. 2 provides an exploded view of the invention.

The invention is illustrated in FIG. 1 in assembled form and in FIG. 2 in exploded form. It comprises the following components:

a) A hitch anchor 1.
b) A fork 2.
c) A sleeve 3.
d) A lower shoulder bar 4.
e) An upper shoulder bar 5.
f) A rim holder 6.

The hitch anchor 1 is constructed of a tubular steel bar with a square cross section. At its front end, the hitch anchor 1 fits inside the hitch 7 located at the back of the ATV. The hitch anchor 1 is secured to the hitch 7 by means of a bolt or a pin 18.

The fork 2 is also constructed of a tubular steel bar with a square cross section. At its forked front end the fork has two tines that enclose the back end of the hitch anchor. A pin 9 traverses the tines of the fork 2 and the hitch anchor 1 thus forming the hinge. The angle between the fork 2 and the hitch anchor 1 can be adjusted by inserting a pin 19 into one of several holes 20 traversing the fork 2 and the hitch anchor 1. These holes 20 are positioned to restrict the movement of the fork 2 and the hitch anchor 1 to particular angles.

The sleeve 3 is also constructed of a tubular steel bar with a square cross section. The non-forked, back end of the fork 2, that is its handle, fits inside the sleeve 3 in a telescopic manner such that the fork 2 can slide in or out thereby changing the geometry of the device. This ability to slide in and out allows them to accommodate tires of different diameters. The handle of the fork 2 and the sleeve 3 are traversed by an array of holes 8, allowing the fork 2 and the sleeve 3 to be secured together by means of a pin 10 to remain fixed with respect to each other for a given telescopic extension. Optionally another pin 24 can be used to secure the sleeve 3 to the fork 2.

The lower shoulder bar 4 is also constructed of a tubular steel bar with a square cross section. It is oriented perpendicularly to the sleeve 3 and affixed to it by means, for example, of a weld.

The upper shoulder bar 5 is also constructed of a tubular steel bar with a square cross section. It fits inside the lower shoulder bar 4 in a telescopic fashion such that it can slide in or out thereby changing the geometry of the device thereby giving the device the ability to accommodate rims of different thicknesses and different rim offsets. The lower shoulder bar 4 and the upper shoulder bar 5 are traversed by an array of holes 11, allowing them to be secured together by means of a pin 12 to remain fixed with respect to each other for a given telescopic extension.

The rim holder 6 is affixed atop the upper shoulder bar 5. The rim holder 6 includes a series of holes 13 matched to the lug pattern of the wheel that is carried by the device. Rim holders 6 configured with different lug patterns can be used to accommodate different spare tires. A set of bolts 18 are used to hold the tire 17 in place.

Figure 3:
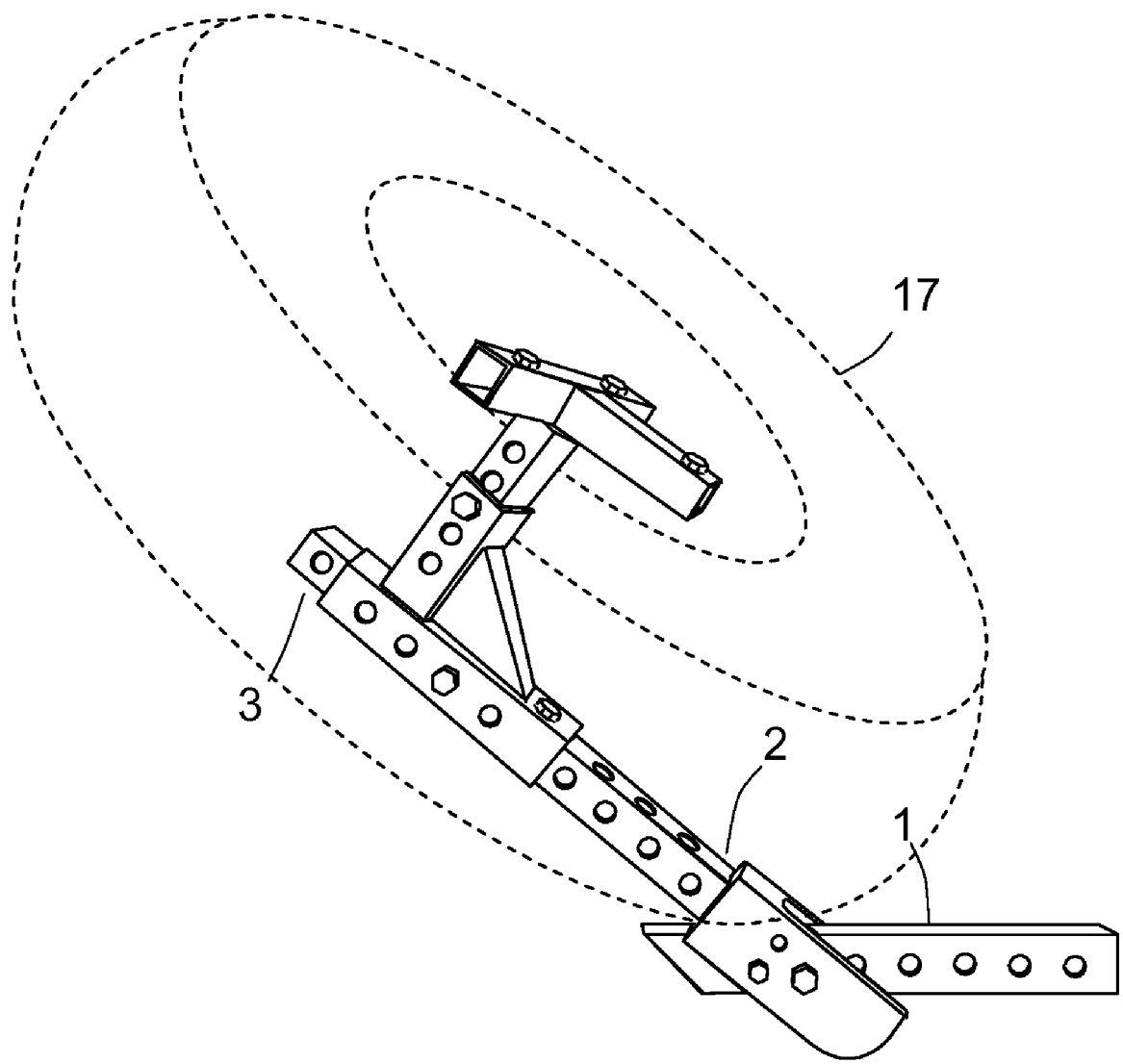
FIG. 3 provides a top view of the invention carrying a tire.
Figure 4:
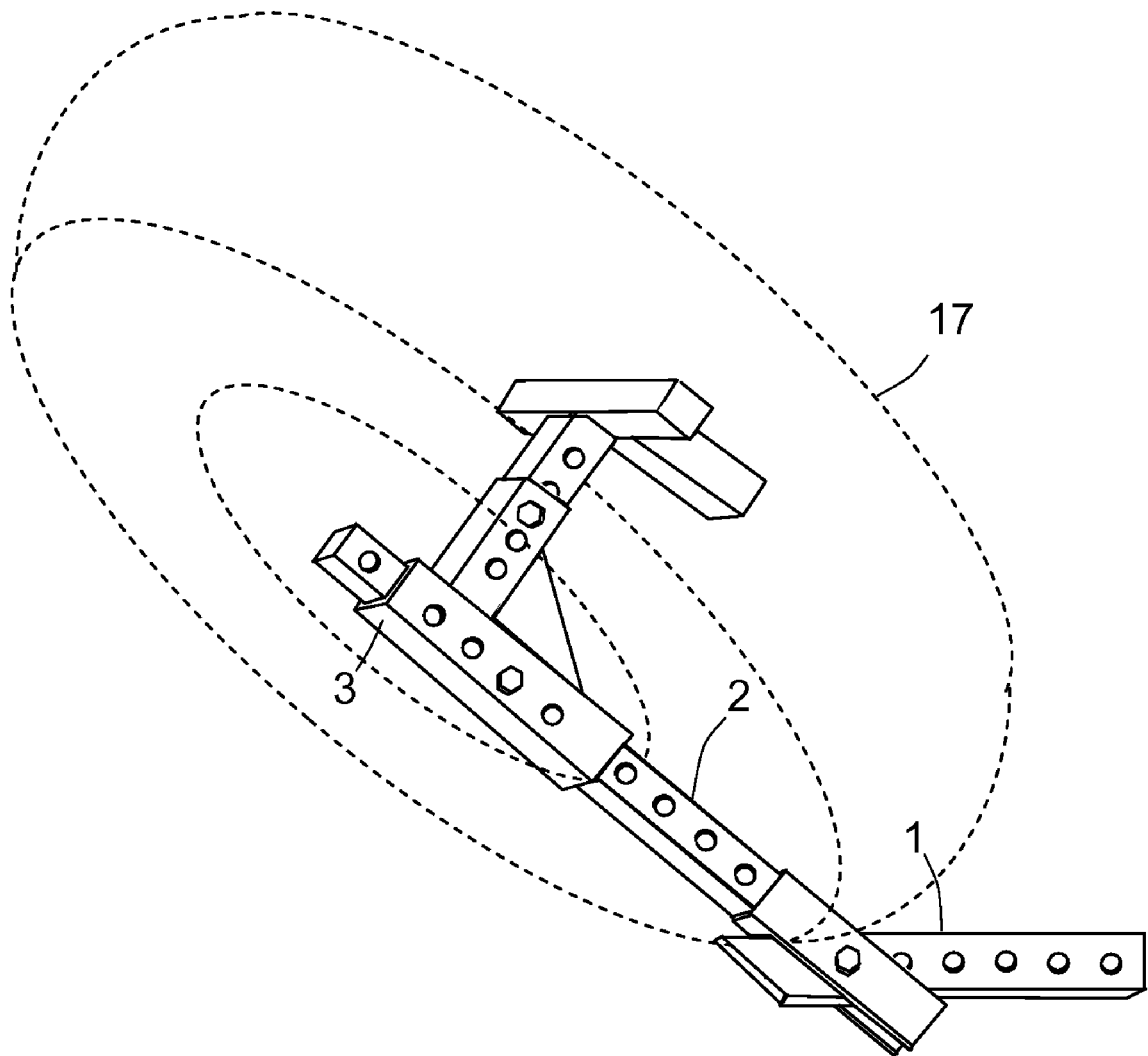
FIG. 4 provides a bottom view of the invention carrying a tire.

FIGS. 3 and 4 provide a top and bottom view of the device as it carries a tire 17. One must note a particular advantage of this invention. The user has the option to slide the fork 2 in the sleeve 3 to allow the tire 17 to rest on top of the hitch anchor 1. This configuration relieves the weight that the sleeve 3 and fork 2 must carry and therefore allows the device components to be constructed with lighter materials. It also reduces the flexing and vibrations of the device as the vehicle is driven over rough terrain.

Figure 5:
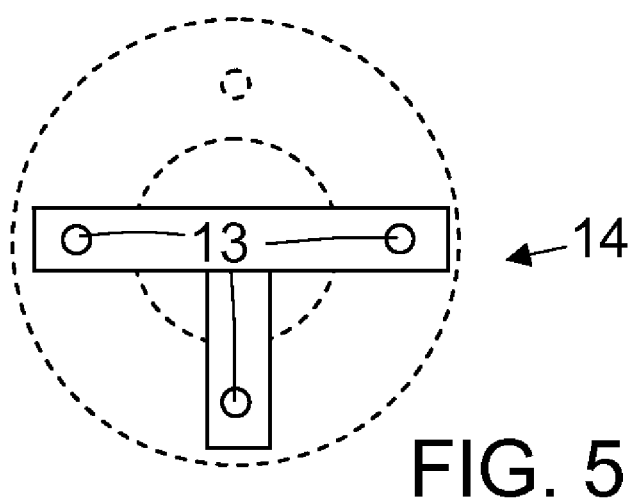
FIG. 5 shows a rim holder configured as a T shaped bar assembly with round holes matching the lug pattern of the tire.
Figure 5A:
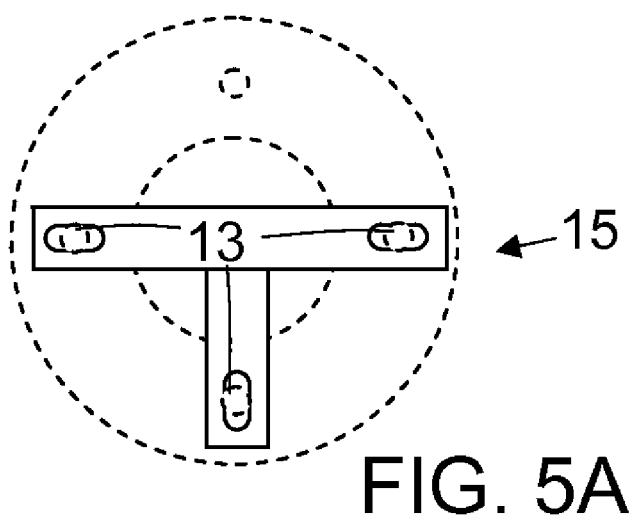
FIG. 5A shows a rim holder configured as a T shaped bar assembly with slot holes matching a range of the lug patterns.
Figure 5B:
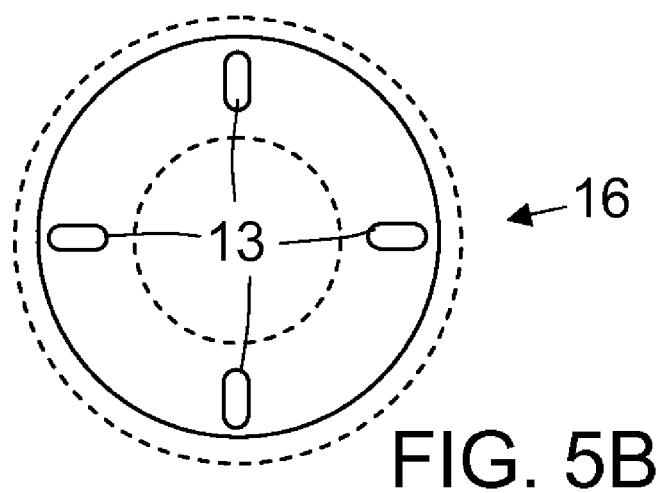
FIG. 5B shows a rim holder in the shape of a circular plate with slot holes matching a range of the lug patterns.

FIGS. 5, 5A and 5B illustrate different rim holder configurations. The rim holder 14 shown in FIG. 5 consists of two bars configured as a "T." Holes are drilled in the arms and in the leg of the T to accommodate a fixed lug pattern. The rim holder 15 shown in FIG. 5A has more flexibility because its holes 13 are slots and therefore can accommodate tires 17 of different sizes. The rim holder 16 shown in FIG. 5B is a plate in which any number of holes 13 can be drilled to accommodate many different tires 17.

Figure 6:
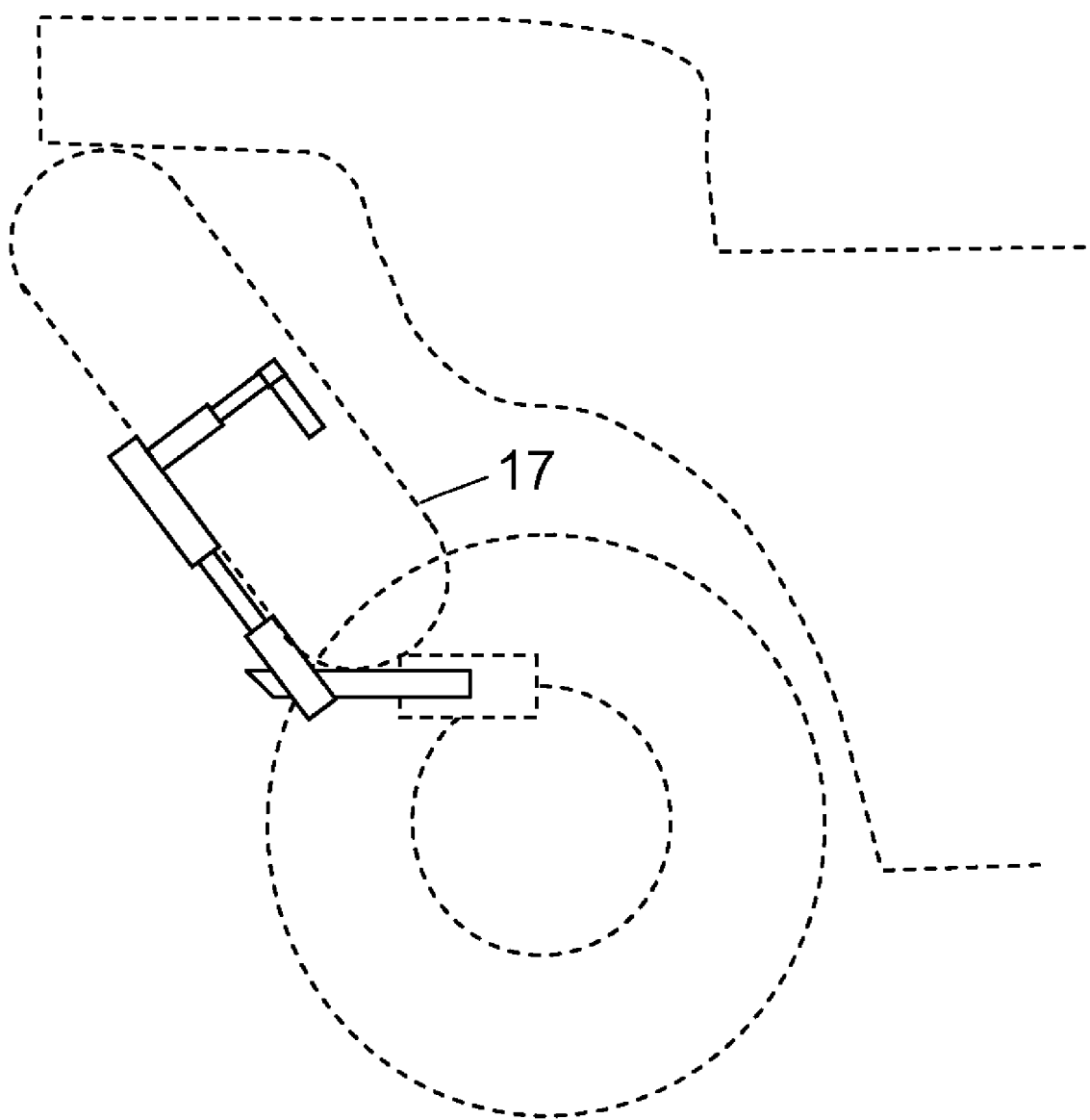
FIG. 6 shows how the invention can carry a tire on its upper side to preserve some of the approach angle of an ATV.

FIG. 6 illustrates how the device can be used in an ATV to carry a tire 17, while preserving some of the approach angle. The angle between the hitch anchor 1 and the fork 2 can be adjusted to accommodate different vehicle geometries and to essentially preserve the approach angle.

The invention furthermore allows the tire 17 to be mounted between the supporting mechanism and the body of the car thereby protecting the tire and allowing the tire to be supported by the hitch anchor 1 as shown in FIG. 6.

Figure 7:
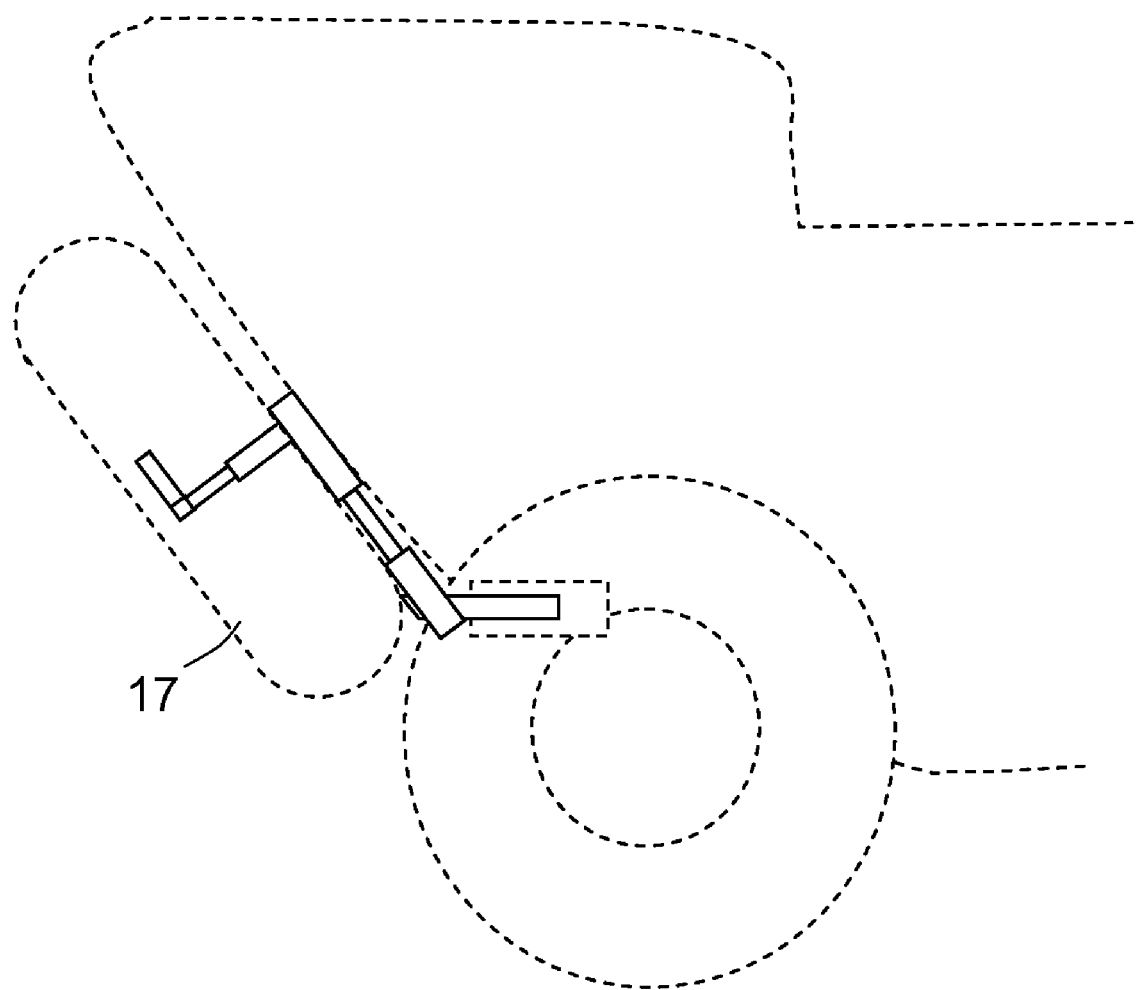
FIG. 7 provides a variation in the in the use of the invention, in which the tire is attached on the underside of the invention.

FIG. 7 shows a possible variation in which the sleeve 3 is rotated 180 degrees around the axis thereby positioning the lower shoulder bar 4, the upper shoulder bar 5 and the rim holder 6 below the sleeve 3. This configuration which permits the tire 17 to be mounted facing down may be useful if the space for stowing the tire 17 is restricted.

Figure 8:
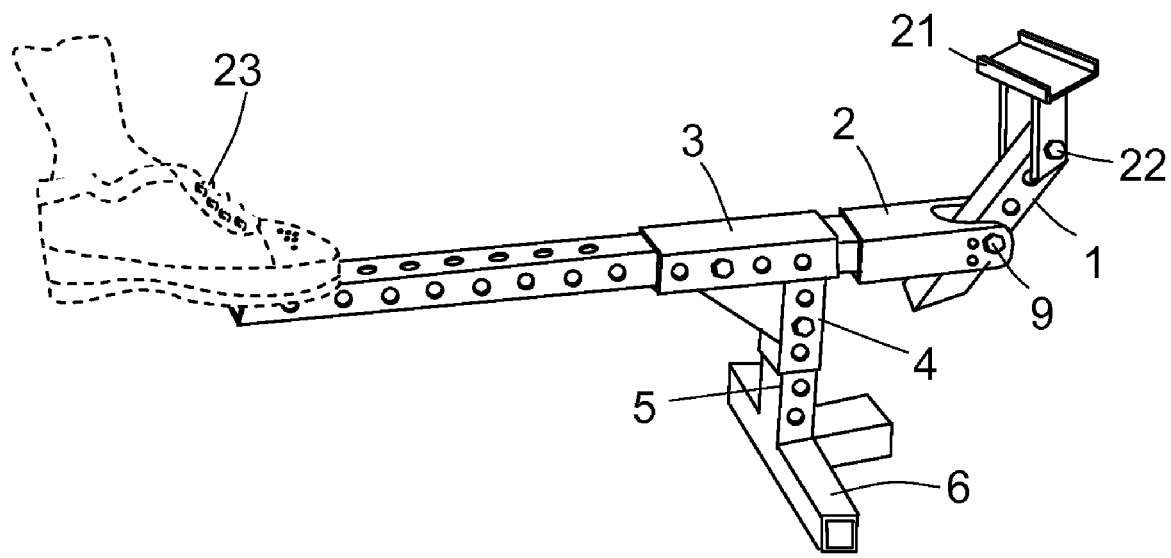
FIG. 8 illustrates how the components of the invention can be assembled in a different configuration to form a jack.

A possible variation in the configuration of this invention is shown in FIG. 8, which allows the invention to be used as a jack. The device's components are disassembled by sliding them out of each others and then reassembled in a different configuration as shown in FIG. 8. In addition, a jack platform 21 is mounted on the hitch anchor 1 by means of a pin or bolt 22. In this new configuration, the rim holder 6 becomes the fulcrum of a lever that allows the user to apply foot pressure 23 to produce a large force to lift the vehicle. The articulation formed by the pin or bolt 22 allows the jack platform 21 to remain in the proper vertical orientation as the lever is tilted. This invention is particularly useful to lift ATV's.

Figure 9:
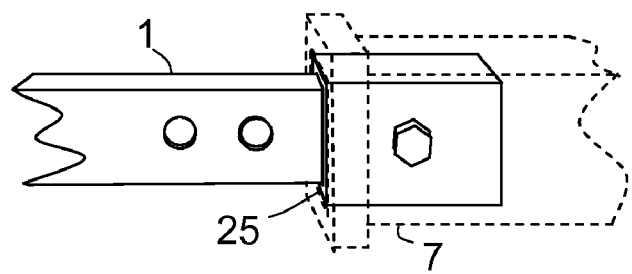
FIG. 9 shows how a sheath can be inserted over the hitch anchor to increase its caliber and make it fit properly inside a large caliber hitch.
Figure 9A:
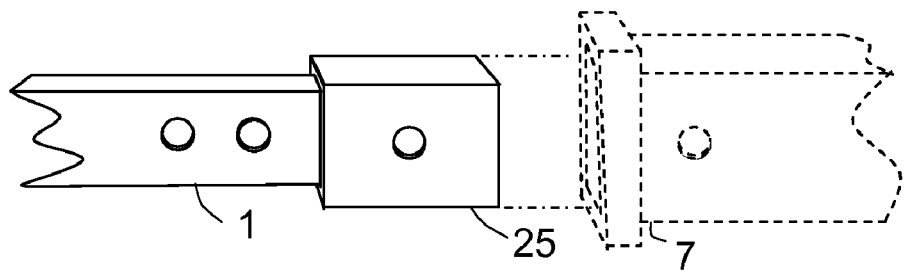
FIG. 9A provides a partially exploded view of the hitch anchor the sheath and the hitch.
Figure 9B:
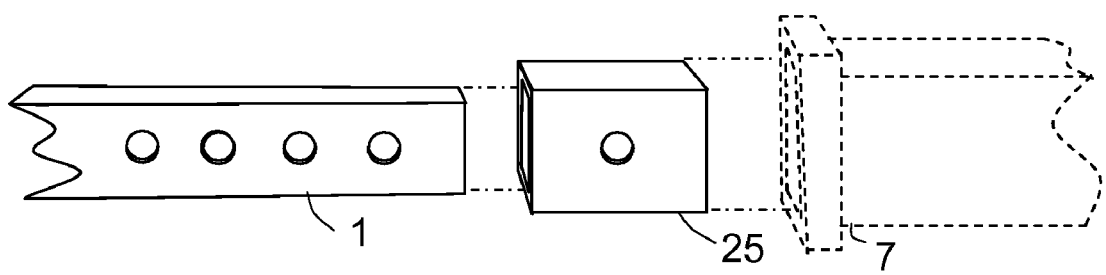
FIG. 9B provides a fully exploded view of the hitch anchor, the sheath and the hitch.

As shown in FIGS. 9, 9A and 9B when the hitch 7 is too large for the hitch anchor 1, it is possible to insert a sheath 25 over the hitch anchor 1 to make it fit properly inside the hitch 7. FIG. 9 illustrates the fully assembled hitch anchor 1, sheath 25 and hitch 7. FIGS. 9A and 9B provide a partially exploded view and a fully exploded view of the assembly, respectively.

It is evident to those versed in the art that this embodiment is only one of many possible variations.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. A spare tire carrier for transporting the wheel of a vehicle, said wheel having predetermined dimensions and equipped with a rim configured with a predetermined lug pattern, said vehicle having a predetermined approach angle and equipped with a towing hitch, said carrier comprising:
   a. a hitch anchor, said hitch anchor having a front end and a back end, said front end configured to be attached to said towing hitch;
   b. a fork comprising a handle and two tines, said tines being located on either side of said back end of, and affixed to, said hitch anchor, fork being fixed in a position with its axis at an oblique angle from the horizontal;
   c. a sleeve slidingly mounted on said handle of said fork, said handle and said sleeve, each configured with an array of holes, sliding motion of said sleeve being restricted by at least one pin traversing at least one of said holes in said sleeve and one of said holes in said handle;
   d. a lower shoulder bar essentially perpendicularly mounted onto said sleeve,
   e. an upper shoulder bar slidingly mounted on said lower shoulder bar, said lower shoulder bar and said upper shoulder bar, each configured with an array of holes, sliding motion of said upper shoulder bar being restricted by at least one pin traversing at least one of said holes in said lower shoulder bar and one of said holes in said upper shoulder bar; and
   f. a rim holder affixed to said upper shoulder bar and carrying an array of holes matching said lug pattern of said rim;
   said sleeve being slidingly adjusted to accommodated said wheel's predetermined dimensions; and said oblique angle formed between said hitch anchor and said fork being adjusted to preserve said approach angle of said vehicle.

2. The spare tire carrier of claim 1 wherein said tines of said fork and said back end of said hitch anchor are traversed by a multiplicity of holes, and said fork is affixed to said hitch anchor by means of at least two pins inserted in at least two of said multiplicity of holes and said oblique angle can be adjusted by selecting which holes in said multiplicity said pins are inserted into.

3. The spare tire carrier of claim 1 wherein said tire is mounted between said and said car, thereby providing some protection for said tire.

4. The spare tire carrier of claim 3 wherein said sleeve is slidingly adjusted such that said wheel rests in part on said hitch anchor.

5. The spare tire carrier of claim 1 wherein said rim holder is equipped with a multiplicity of holes configured to accommodate several said lug patterns.

6. The spare tire carrier of claim 1 also comprising a sheath adapted to fit over said hitch anchor and inside said hitch.

7. The spare tire carrier of claim 1, wherein said spare tire carrier is converted to a jack to lift a car, said spare tire carrier being in the form a lever having a long arm, a short arm and a fulcrum, said rim holder, when placed in contact with the ground forming said fulcrum, said sleeve being slid along said fork handle to form said long arm on handle side of said fork, and to form said short arm on the tine side of said fork, thereby allowing a force to be multiplied when applied to said long arm of said lever, said force being used to lift a car.

8. The spare tire carrier of claim 7 also comprising a jack platform said platform being hingedly mounted on said hitch anchor which is itself mounted on the tine side of said fork.

9. A method of utilizing said spare tire carrier of claim 1 as an lifting jack for raising a car, said lifting jack configured in the shape of a lever having a short arm, a long arm and a fulcrum, said method comprising:
  a. positioning said rim holder against the ground, thereby forming said fulcrum;
  b. positioning said sleeve such that said fork is divided into said long arm and said short arm;
  c. securing said sleeve to said fork by means of pins;
  d. positioning said short end of said lever underneath and in contact with said car,
  e. applying a force on said long arm of said lever thereby lifting said car.

10. The method of claim 9 also comprising affixing a jack platform by means of a hinged mount, on said hitch anchor located on short arm of said lever, said short end of said lever making contact with said car through jack platform.

11. The method of claim 9 wherein said car is an all terrain vehicle.

* * * * *